United States Patent [19]

Carter

[11] Patent Number: 5,762,023

[45] Date of Patent: Jun. 9, 1998

[54] SORBENT COMPOSITION WITH POLYSACCHARIDE CLUMPING AGENT AND BORON-BASED CROSS-LINKING AGENT

[75] Inventor: Walter H. Carter, Dalton, Ga.

[73] Assignee: Alterlink, Inc., Tallahassee, Fla.

[21] Appl. No.: 749,405

[22] Filed: Nov. 15, 1996

Related U.S. Application Data

[63] Continuation of Ser. No. 640,258, Apr. 30, 1996, abandoned.

[51] Int. Cl.$^6$ ..................................... A01K 1/015
[52] U.S. Cl. ........................................... 119/173
[58] Field of Search ............................ 119/171, 173

[56] References Cited

U.S. PATENT DOCUMENTS

| | | | |
|---|---|---|---|
| 3,903,889 | 9/1975 | Torr . | |
| 3,921,581 | 11/1975 | Brewer | 119/173 |
| 4,159,260 | 6/1979 | Jones et al. | 260/17.4 GC |
| 4,187,803 | 2/1980 | Valenta | 119/173 |
| 4,560,527 | 12/1985 | Harke et al. | 264/500 |
| 4,591,581 | 5/1986 | Crampton et al. | 502/407 |
| 4,621,011 | 11/1986 | Fleischer et al. | 428/221 |
| 4,641,605 | 2/1987 | Gordon . | |
| 4,657,881 | 4/1987 | Crampton et al. | 502/80 |
| 4,676,196 | 6/1987 | Lojek et al. | 119/171 X |
| 4,685,420 | 8/1987 | Stuart | 119/173 |
| 4,844,010 | 7/1989 | Ducharme et al. | 119/173 |
| 4,914,066 | 4/1990 | Woodrum | 502/62 |
| 4,949,672 | 8/1990 | Ratcliff et al. | 119/173 |
| 5,014,650 | 5/1991 | Sowle et al. | 119/171 |
| 5,018,482 | 5/1991 | Stanislowski et al. | 119/173 |
| 5,094,189 | 3/1992 | Aylen et al. | 119/173 |
| 5,094,190 | 3/1992 | Ratcliff et al. | 119/173 |
| 5,101,771 | 4/1992 | Goss | 119/173 |
| 5,176,107 | 1/1993 | Buschur | 119/173 |
| 5,176,108 | 1/1993 | Jenkins et al. | 119/173 |
| 5,183,010 | 2/1993 | Raymond et al. | 119/172 |
| 5,188,064 | 2/1993 | House | 119/172 |
| 5,190,996 | 3/1993 | Foran et al. | 524/28 |
| 5,193,489 | 3/1993 | Hardin | 119/173 |
| 5,230,305 | 7/1993 | House | 119/171 |
| 5,279,259 | 1/1994 | Rice et al. | 119/173 |
| 5,339,769 | 8/1994 | Toth et al. | 119/173 |
| 5,352,780 | 10/1994 | Webb et al. | 536/56 |
| 5,359,961 | 11/1994 | Goss et al. | 119/173 |
| 5,421,291 | 6/1995 | Lawson et al. | 119/173 |

FOREIGN PATENT DOCUMENTS

| | | |
|---|---|---|
| 0 165 820 | 6/1985 | European Pat. Off. . |
| 3644826 | 7/1987 | Germany . |
| 1-191626 | 8/1989 | Japan . |
| WO 90/12496 | 11/1990 | WIPO . |

OTHER PUBLICATIONS

Kirk–Othmer, Encyclopedia of Chemical Technology, 4th Ed; vol. 4 (1992) pp. 365–413 related to "Boron Orides, Boric Acid and Borates".

Primary Examiner—Robert P. Swiatek
Attorney, Agent, or Firm—Kerkam, Stowell, Kondracki & Clarke, P.C.; Edward J. Kondracki

[57] ABSTRACT

A sorbent litter composition comprising a dry mix of a particulate earth substrate, polysaccharide in an amount sufficient to improve the inherent clumping ability of the particulate earth substrate upon contact with liquid, and at least one boron-based cross-linking agent in an amount substantially less than the polysaccharide. The invention further comprises a method for preparation of a sorbent litter composition.

13 Claims, No Drawings

SORBENT COMPOSITION WITH POLYSACCHARIDE CLUMPING AGENT AND BORON-BASED CROSS-LINKING AGENT

This application is a continuation of application number 08/640,258, filed Apr. 30, 1996, now abandoned.

FIELD OF THE INVENTION

The invention relates to sorbent compositions having particles which agglomerate upon contact with water and other liquids. More specifically, the invention relates to animal litter compositions having polysaccharide clumping agents and boron-based cross-linking agents.

BACKGROUND OF THE INVENTION

Sorbent compositions of particulate earth substrates such as clays, diatomaceous earth materials, and other inert materials have been used to absorb or adsorb free liquids. One application of such compositions has been as animal litters to collect the solid and liquid waste excretions of household pets, particularly cats. The litter is commonly said to absorb the liquid, although regarding some compositions (depending on the particulate earth substrate), it may be more accurate to say the liquid is adsorbed on the surface of the particulate earth substrate. Throughout this disclosure, the words "sorbent" and "sorption" will indicate the general process of liquid uptake and retention by a particulate earth substrate.

Prior art litters did not satisfactorily handle liquid excretions. The liquid excretions were not readily separable from the litter, necessitating frequent disposal and replacement of most or all the litter in the litter container.

In response to this and other insufficiencies, attempts were made to develop "clumpable" litters, in which the inherent tendency of natural earth materials to agglomerate into masses or clumps upon contact with water was utilized. Clumping is a tendency in certain earths for the earth particles to adhere firmly to each other when wet to form a cohesive mass. A clump may be defined as a solid and removable mass that forms when a liquid is added to a litter. For an ideal clumpable litter, the portion of litter contacting liquid excretion absorbs or adsorbs the liquid while the remainder of the litter remains untainted by the excretion. As the liquid excretion becomes entrapped in the clump, it can be separated and removed with the clump from the remainder of the litter. Where the clay, earth or other inert material has good clumping properties substantially all of the liquid may be retained in the clump and the portion of the earth which remains after the removal of the clump may be completely dry. The clumping property provides a means for removing urine from used litter which, in conjunction with the physical removal of feces, results in a residue of uncontaminated litter, free of undesired odors, which may be replenished with fresh litter. This represents an economical use of litter in comparison with the complete replenishment of the litter.

Many of those natural earth materials which tend to clump when wet do not form clumps having sufficient physical integrity to enable a person to remove the mass from the remainder of the earth particles without undue crumbling or loss of peripheral material. Breakage of clumps containing excretion represents a problem, as it results in fragments of dirty litter remaining in the cleaned litter container, yielding continued unpleasant odors.

Clumping agents may be added to the clay, earth or other inert material to enhance the clumping performance of litters, thereby facilitating the removal of excretion-containing clumps from the litter. Clumping agents improve upon the natural clumping tendencies of the base materials. Litters which are treated with clumping agents form clumps with greater structural strength and integrity. A pet owner can remove these stronger, more durable clumps from the litter container as discrete entities which have less tendency to break apart during the removal process.

Clumping agents may improve clumping performance by acting as an adhesive which becomes activated upon contact with water and other aqueous liquids. Clumping agents of this type form a gel product upon contact with liquids which exhibits a high degree of gel strength. Typically, the clumping agent absorbs aqueous liquids and gels, resulting in the formation of an agglomerate of clumping agent, inert material such as clay, and liquid of sufficient structural strength and integrity that the agglomerate may be mechanically removed from the remaining litter.

Several clumping agents have been disclosed previously. For example, U.S. Pat. No. 4,685,420 discloses the use of a water absorbent polymer produced by polymerizing at least one monomer selected from the group consisting of acrylic acid, methacrylic acid and alkali metal salts of acrylic acid and methacrylic acid. Although these and other clumping agents, when added to clays, diatomaceous earths, and other inert materials, have yielded litters which have somewhat increased clumping performance than litters which do not include clumping agents, a demand still persists for improved litters having greater clumping performance.

In particular, purchasers of sorbent litter compositions seek litters which clump more quickly upon contact with liquid excretions, so as to prevent the liquid excretion from spreading throughout the litter material. Quicker clumping reduces the amount of litter contaminated and extends the useful life of the litter set out in the litter container, making the quicker clumping litter more economical than litters requiring more frequent disposal of all the litter.

Another desirable property of litters is greater structural strength or integrity of agglomerated clumps. As described above, stronger clumps exhibit less tendency to fragment during removal from the litter container. Good structural integrity means that clumps do not easily break apart when being removed from the litter box. Structural integrity may also be expressed as the firmness or hardness of the clump. Clumps having good structural integrity will also better withstand impact without fragmenting, such as may occur if clumps are dropped during the removal process.

Additionally, the litter composition should form clumps which remain stable with the passage of time so that immediate removal of clumps is not necessary, although the quick clumping upon contact with water makes immediate removal possible. Stability or increased integrity over a period of hours or days is desirable in this regard.

Another example of previous clumping agents is found in U.S. Pat. No. 5,359,961, which discloses litter compositions formed by a wet mix of galactomannan gums distributed by a non-toxic liquid vehicle upon the surface of clay particles. The liquid vehicle is required to separate the galactomannan gum particles during the wet mixing manufacturing process, and the liquid vehicle functions as a binder for the clumping agent. Borax, xanthan gum, carrageenan gum or alginates are separately disclosed as optional additional agents that may be included in the litter composition. The requirement of the liquid vehicle or carrier and the wet mixing of this litter composition makes the preparation of this litter composition more costly, time-consuming and difficult than dry mixing. Furthermore, litter compositions using borax in amounts up to or greater than one percent by weight represent an inefficient and wasteful use of borax as a litter additive. Such litter compositions exhibit suboptimal clumping performance in terms of the immediate and later integrity and hardness of the clump.

SUMMARY OF THE INVENTION

An object of the invention is to provide a sorbent litter composition that upon contact with liquid agglomerates into clumps with improved structural strength and integrity.

Another object of the invention is to provide an animal litter having greater clumping performance, including greater structural strength and integrity.

Yet another object is to provide an animal litter from which liquid excretions are easily removable as structurally solid masses.

Another object of the invention is to provide an animal litter which forms clumps which retain or increase their structural integrity with the passage of time.

The present invention relates to sorbent litter compositions comprising a dry mix of one or more particulate earth substrates with polysaccharide and at least one boron-based cross-linking agent in an amount substantially less than the polysaccharide. The sorbent litter composition of the present invention comprises an amount of polysaccharide sufficient to improve the inherent clumping ability of the particulate earth substrate upon contact with a liquid. The present invention also relates to a process for preparing this sorbent litter composition through dry mixing.

DETAILED DESCRIPTION OF THE INVENTION

The present invention is a dry mix of an inert particulate earth substrate, a polysaccharide and at least one boron-based cross-linking agent. The polysaccharide acts as a clumping agent, and the boron-based cross-linking agent forms cross links or bonds which provide even greater structural integrity in clumps formed by the invention upon contact with liquid. The litter composition of the present invention prepared by a dry mix of the constituents demonstrates greater structural strength and integrity than many prior litter compositions. The invention also comprises a process for the preparation of a sorbent litter composition that agglomerates upon contact with a liquid, comprising the step of dry mixing a particulate earth substrate, a polysaccharide in an amount sufficient to improve the inherent clumping ability of the particulate earth substrate upon contact with liquid, and at least one boron-based cross-linking agent in an amount substantially less than the polysaccharide.

Many particulate earth substrates are suitable for use in the present invention. Porous clays are readily available for use as the substrate. Their suitability as sorbents makes them excellent base materials for litters. Furthermore, clays have the additional advantage of exhibiting superior odor containment properties when mixed with the boron compounds of the present invention. Suitable clays include South Georgia and Mississippi clays and Southeast Fuller's earth. More generally, suitable clays may include montmorillonite, smectite, attapulgite, bentonite, palygorskite, kaolinite, illite, halloysite, hectorite, beidellite, nontronite, saponite, hormite, vermiculite, sepiolite, and mixtures thereof. Additionally, the present invention may employ fossilized plant materials, expanded perlites, zeolites, and gypsum.

Preferably, the earth substrate has an overall particle size such that about ninety-five percent of the particles are in the range of from about −10 to about +140 mesh (All mesh sizes used herein are from the U.S. Standard Sieve Series), alternatively from about −18 to about +100 mesh, alternatively from about −20 to about +50 mesh.

The particulate earth substrate constitutes the bulk of the sorbent litter composition of the present invention. Typically the substrate by weight of the litter composition will comprise from about 90 percent to about 99.9 percent of the composition. In alternative embodiments of the invention, the earth substrate will comprise from about 96 percent by weight to about 99.8 percent by weight of the composition. In other embodiments, the substrate will comprise from about 97 percent to 98 percent, alternatively 97.5 percent of the composition. The percentage of substrate employed in the invention will depend upon the amounts of clumping and cross-linking agents needed to provide sufficient clumping performance in the litter composition. Litter compositions comprised of particulate earth substrates having varying degrees of inherent clumping ability will require different amounts of the clumping and cross-linking agents to attain a sufficient clumping performance. Nonetheless, the present invention optionally contemplates the use of earth substrates having a relatively high degree of clumping ability, as those substrates will demonstrate improved clumping when utilized in accordance with the present invention.

The polysaccharide of the present invention serves as a clumping agent which, upon contact with liquids, clumps to form solid masses from the particulate earth substrate. Suitable polysaccharides include starches such as wheat paste, cellulose materials, and natural and modified gums. Suitable gums for the present invention include botanical gums such as gum arabic, gum karaya, gum tragacanth, and gum ghatti. Of particular suitability for the present invention are the galactomannan gums, notably guar gum and locust bean gum.

The galactomannans may be selected according to the invention to be effective at relatively low concentrations and to give a fast clumping response. The last-mentioned property contributes to the economy of the litter in use since it assists in confining the liquid excretion to a relatively compact volume of the litter.

The gums used according to this invention are preferably relatively purified and may be derivatised, e.g. by reaction with propylene oxide to form the hydroxy propyl ether, to augment their hydrophilic character. Purified gums derivatised to augment their hydrophilic character are particularly effective according to the invention.

Preferably the galactomannan gum selected according to the invention is a guar gum or derivative thereof having one or more of the characteristics outlined above. Guar gum is available commercially from Aqualon Company or Rhone-Poulenc, Inc. This, or other galactomannan gum, when used in dry, particulate form as hereafter described, may contain a restricted quantity of water which is preferably present in less than 20% by weight and/or in a quantity which does not impair the flowability or handling qualities of the material.

The present invention comprises a polysaccharide in an amount sufficient to improve the inherent clumping ability of the particulate earth substrate. In the practice of the invention, the amount sufficient to yield an improvement will vary according to the specific type of substrate employed, with less polysaccharide required to improve substrates which have good inherent clumping ability. Embodiments of the present composition may contain from about 0.08 percent to about 9 percent, alternatively, from about 0.2 percent to about 2 percent, alternatively about 1.3 percent by weight of a polysaccharide.

The boron-based cross-linking agent of the present invention is believed to form cross links comprised of hydrogen bonds between cis-hydroxyl groups of two polysaccharide polymer chains. Any boron-based compound which effectively forms such cross-links between separate polysaccharide chains is suitable for the present invention. Borates, perborates and metaborates of any metal cation, such as sodium, may all be used as a boron-based cross-linking agent in the present invention. Boric acid is generally not preferred for use in the present invention, due to its low pH's in solution. However, boric acid may be employed in litter compositions of the invention when a base such as calcium hydroxide is included.

Borax ($Na_2B_4O_7 \times nH_2O$, where n=4, 5 or 10) is a preferred compound for use in the invention. Borax can be commercially obtained from vendors such as U.S. Borax. Other suitable boron-based cross-linking agents include dicalcium hexaborate pentahydrate, dipotassium tetraborate tetrahydrate, disodium octoborate tetrahydrate, disodium tetraborate, disodium tetraborate pentahydrate, disodium tetraborate tetrahydrate, dizinc hexaborate heptahydrate, diammonium tetraborate tetrahydrate, potassium pentaborate tetrahydrate, sodium calcium pentaborate octahydrate, sodium calcium pentaborate pentahydrate, sodium metaborate dihydrate, sodium metaborate tetrahydrate, sodium pentaborate pentahydrate, sodium perborate tetrahydrate, sodium perborate trihydrate, sodium perborate monohydrate, zinc salt (1:2) borate hydrate, zinc diborate dihydrate, and zinc triborate monohydrate. Other boron-based compounds potentially suitable for use are disclosed in Kirk-Othmer, *Encyclopedia of Chemical Technology*, 4th Ed., Vol. 4, pp. 365–409 (1992), said pages being incorporated herein by reference.

The boron-based cross-linking agent of the present invention is present in an amount substantially less than the polysaccharide. Embodiments of the present invention may comprise from about 0.01 percent to about 0.5 percent, alternatively from about 0.03 percent to about 0.3 percent, alternatively about 0.25 percent by weight of the composition. The litter compositions of the invention comprise less boron compound than previously thought necessary to derive substantial benefit from its inclusion. One aspect of the present invention arises from the finding that litter compositions having less boron compound or borate than suggested before are not only effective but in fact show greater clumping performance. Thus, litter compositions of the present invention may be prepared at lower cost while demonstrating increasing effectiveness in aiding clumping performance.

To prepare the litter of the present invention, particles of the earth are dry mixed with particles of the polysaccharide and the boron-based cross-linking agent. Surprisingly it has been found that the polysaccharide gums do not segregate unduly from the earth. Mixing of the constituent earth substrate, the boron-based cross-linking agent and the polysaccharide may be accomplished by any mixing device which is suitable for blending particulate solids without appreciably abrading them or otherwise causing an undue reduction in particle size, for example a double cone or V-shaped rotating tumble blender in a batchwise operation or cascaded variable speed screw devices feeding an internally mixed blend/product hopper in a continuous mode.

The compositions of the present inventions are prepared through a dry mixing process wherein the constituent earth substrate, polysaccharide and boron-based cross-linking agent are combined and blended into the finished litter composition without the use of a liquid solvent. The present invention contemplates that an excellent distribution of polysaccharide and cross-linking agent upon the surface of the earth substrate may be accomplished without the use of a liquid vehicle. However, in some embodiments of the present invention, after dry mixing the substrate, polysaccharide and cross-linking agent, on can wet down the composition by overspraying it with a liquid vehicle. Said liquid vehicle may be aqueous or oleaginous in nature and may include components such as surfactants, viscous polymer polysaccharides, or polyacrylamides. Liquid vehicles are disclosed in U.S. Pat. No. 5,359,961, which is incorporated by reference herein.

Litter compositions prepared by dry mixing have the advantage over compositions prepared through the use of wet mixing in that the former are easier and more economical to prepare and as a finished product are less messy to handle.

Generally, the litter compositions of the present invention will form solutions having pH's higher than about 7, alternatively higher than about 8, when placed in an environment having sufficient water to dissolve the soluble portions of the composition.

Litter compositions of the present invention are not limited to comprising polysaccharide, boron-based cross-linking agent, and particulate earth substrates. Many of the additives currently employed in the animal litter arts may be included to impart various desirable characteristics. For example, but not by way of limitation, litter compositions of the present invention may include perfumes, deodorants, odor sorbents, antimicrobial agents, disinfectants, colorants, and pesticides.

The usefulness of the present invention is not limited to utility as a litter for household pets. It is contemplated that embodiments of the present invention may be employed in sorbing and containing water in numerous other fields. For example, horticulturalists may find the present invention useful. As another example, the present invention may provide a biodegradable support structure. Another utility of the present invention may lie in the field of fire-fighting. Additionally, the present invention may be useful in the collection or containment of human or other animal waste products in other environments.

The following examples, experiments and results provide a basis for understanding the nature of the invention and illustrate the superior clumping performance of the invention over the prior art.

EXAMPLES

Tests to determine the clumping performance of the litter composition of the present invention were performed as follows. The tests may be summarized as determining the ability of clumps formed by litter compositions of the present invention and of the prior art to withstand force and resist fragmentation.

Four different litter compositions were prepared by the following method. For each of the compositions, two or more individual runs were made and the results were averaged. A calcium montmorillonite clay was selected which had an overall particle size distribution of about 95 percent by weight of 20 to 50 mesh U.S. Sieve Standard. Approximately equivalent portions of the clay were used to make the various litter compositions. One composition, Litter 1, consisted of clay without any clumping agent or boron compound. Litter 2 was comprised of a dry mix of clay and approximately 0.225 percent by weight borax. Litter 3 was comprised of a dry mix of clay and approximately 1.275 percent by weight guar gum. Litter 4 was comprised of a dry mix of clay, approximately 1.275 percent by weight guar gum, and approximately 0.225 percent by weight borax. Litter 4 comprised an embodiment of the present invention. These compositions were selected to demonstrate the synergistic effect of the present invention over the prior art by demonstrating the unexpected degree of superiority of the composition having guar gum and borax over the compositions having only one or the other.

Each of the compositions was tested according to the following method. A sample of the composition was placed into a pan. Thirty cubic centimeters of water was poured onto the litter composition. One or more distinguishable clumps would form from the composition sample. After 15 minutes, a clump was removed and evaluated by hand. This manual evaluation consisted of feeling the clump and rating its firmness as soft, medium or hard. See Table I below for the results of this manual evaluation.

Additionally, Litters 3 and 4 were subjected to an instrumental evaluation. A force gauge was used to measure how much force in pounds was required to break clumps from Litters 3 and 4. A clump was supported on a pair of longitudinal, spaced supports. Pressure was then applied to the top of the clump using a force gauge commercially obtained from Chattilon Company. The force was applied to the clump at a position approximately halfway between the two supports such that an equal force was applied to each support. The force on the clump was increased until a conspicuous break in the clump occurred, at which point the force on the gauge was measured. See Table II below for the results of the instrumental evaluation.

The evaluations were performed on clumps at varying times after the introduction of the water to the litter composition. Manual evaluation was performed on clumps 15 minutes and 60 minutes after the water was deposited upon the litter. Evaluation with the force gauge was performed on clumps 15 minutes, 60 minutes and 240 minutes afterwards. Testing the clumps at varying ages provided an indication as to whether the integrity of the clumps increased or decreased with the passage of time.

TABLE I

| Clump Firmness (manual evaluation) | | |
| --- | --- | --- |
| Litter Composition | 15 min | 60 min |
| Litter 1 (Clay only) | soft | soft |
| Litter 2 (Clay with Borax) | soft | soft |
| Litter 3 (Clay with Guar Gum) | medium | medium |
| Litter 4 (Clay with Guar Gum and Borax) | hard | hard |

TABLE II

| Clump Hardness (in pounds) | | | |
| --- | --- | --- | --- |
| Litter Composition | Hardness after 15 minutes | Hardness after 60 minutes | Hardness after 240 minutes |
| Litter 3 | 0.4 | 0.62 | 0.8 |

TABLE II-continued

| Clump Hardness (in pounds) | | | |
| --- | --- | --- | --- |
| Litter Composition | Hardness after 15 minutes | Hardness after 60 minutes | Hardness after 240 minutes |
| Litter 4 | 0.66* | 1.0* | 2.1* |

As Table I indicates, the litter compositions of the present invention, embodied in Litter 4, exhibited greater firmness than litter compositions having either polysaccharide or a boron-based cross-linking agent alone. These results indicate that dry-mixing polysaccharide and a boron-based cross-linking agent with a clay substrate yields an unexpected synergistic improvement in the firmness of the resulting litter composition.

Table II indicates that greater force is required to break apart the clumps which are formed upon contact with liquid by compositions of the present invention that by compositions only having a particulate earth substrate and a polysaccharide. After 15 minutes, 65% more force was required to break clumps from compositions having polysaccharide and the boron-based cross-linking agent than to break compositions having polysaccharide alone. After one hour, 61% more force was required, and after 4 hours, 163% more force was required.

The compositions of Litter 4 (denoted by "*" in Table II) demonstrated a wider range of hardness values which varied according to the inherent bonding ability of the clay employed in the compositions. This effect did not appear among the compositions of Litter 3, which showed little variety in hardness among clays of different bonding abilities. This surprising result is believed to be attributable to the boron-based cross-linking agent additive enhancing the natural bonding ability of the clay and bonding or cross-linking the wetted clay particles together into a firm clump.

The above specification, examples and data provide a basis for understanding and using the disclosed invention. However, any embodiment of the invention within the scope of the claims can be made without departing from the spirit and scope of the invention. The invention resides in the claims which follow.

We claim:

1. A substantially dry sorbent litter composition consisting essentially of a dry mix of a particulate earth substrate, a polysaccharide in an amount sufficient to improve the inherent clumping ability of the particulate earth substrate upon contact with liquid, and at least one boron-based cross-linking agent in an amount in the range of from about 0.01 to about 0.5% by weight based on the weight of the composition.

2. The sorbent litter composition of claim 1 wherein said polysaccharide is selected from the group consisting of galactomannan gums.

3. The sorbent litter composition of claim 1 wherein said polysaccharide is selected from the group consisting of guar gum, xanthan gum, locust bean gum, and ether derivatives thereof.

4. The sorbent litter composition of claim 3 comprising from about 0.08% to about 9% of said guar gum.

5. The sorbent litter composition of claim 3 comprising from about 0.2% to about 2% of said guar gum.

6. The sorbent litter composition of claim 3 comprising about 1.3% of said guar gum.

7. The sorbent litter composition of claim 1 wherein said polysaccharide is guar gum.

8. The sorbent litter composition of claim 1 wherein said at least one boron-based cross-linking agent is a borate compound.

9. The sorbent litter composition of claim 1 wherein said at least one boron-based cross-linking agent is selected from the group consisting of borates, perborates and metaborates.

10. The sorbent litter composition of claim 1 wherein said at least one boron-based cross-linking agent is borax.

11. The sorbent litter composition of claim 10 comprising from about 0.015% to about 0.5% of borax.

12. The sorbent litter composition of claim 10 comprising from about 0.03% to about 0.3% of borax.

13. The sorbent litter composition of claim 10 comprising about 0.2% of borax.

* * * * *